(12) United States Patent
Tran

(10) Patent No.: US 12,541,369 B2
(45) Date of Patent: Feb. 3, 2026

(54) EXECUTING PHANTOM LOOPS IN A MICROPROCESSOR

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 21 days.

(21) Appl. No.: 18/135,481

(22) Filed: Apr. 17, 2023

(65) Prior Publication Data

US 2024/0020122 A1    Jan. 18, 2024

Related U.S. Application Data

(60) Provisional application No. 63/368,280, filed on Jul. 13, 2022.

(51) Int. Cl.
*G06F 9/38* (2018.01)
*G06F 9/30* (2018.01)
*G06F 9/32* (2018.01)

(52) U.S. Cl.
CPC ........ *G06F 9/3826* (2013.01); *G06F 9/30141* (2013.01); *G06F 9/325* (2013.01); *G06F 9/3836* (2013.01)

(58) Field of Classification Search
CPC ............. G06F 9/30098; G06F 9/30138; G06F 9/30141; G06F 9/325; G06F 9/3824; G06F 9/3826; G06F 9/3828; G06F 9/383; G06F 9/3836; G06F 9/3838
See application file for complete search history.

(56) References Cited

U.S. PATENT DOCUMENTS

| | | |
|---|---|---|
| 5,021,985 A | 6/1991 | Hu et al. |
| 5,185,868 A | 2/1993 | Tran |
| 5,187,796 A | 2/1993 | Wang et al. |
| 5,251,306 A | 10/1993 | Tran |
| 5,497,467 A | 3/1996 | Wakui et al. |
| 5,655,096 A | 8/1997 | Branigin |
| 5,689,653 A | 11/1997 | Karp et al. |
| 5,699,536 A | 12/1997 | Hopkins et al. |

(Continued)

FOREIGN PATENT DOCUMENTS

| | | |
|---|---|---|
| EP | 0840213 A2 | 5/1998 |
| EP | 0902360 A2 | 3/1999 |

(Continued)

OTHER PUBLICATIONS

H. O. Kultala et al., "Exposed datapath optimizations for loop scheduling," 2017 International Conference on Embedded Computer Systems: Architectures, Modeling, and Simulation (SAMOS), Pythagorion, Greece, pp. 171-178 (Year: 2017).*

(Continued)

*Primary Examiner* — Andrew Caldwell
*Assistant Examiner* — Kasim Alli
(74) *Attorney, Agent, or Firm* — Appleton Luff

(57) ABSTRACT

A processor includes a loop detection unit to detect a phantom-loop based on the resources reserved for execution of the phantom loop. The processor executes the phantom loop by reading source operand data on a first iteration of the loop and writing back data on the last iteration of the loop while allowing instructions after the loop to be concurrently executed.

24 Claims, 7 Drawing Sheets

(56) References Cited

U.S. PATENT DOCUMENTS

| | | |
|---|---|---|
| 5,799,163 A | 8/1998 | Park et al. |
| 5,802,386 A | 9/1998 | Kahle et al. |
| 5,809,268 A | 9/1998 | Chan |
| 5,835,745 A | 11/1998 | Sager et al. |
| 5,860,018 A | 1/1999 | Panwar |
| 5,870,579 A | 2/1999 | Tan |
| 5,881,302 A | 3/1999 | Omata |
| 5,903,779 A | 5/1999 | Park |
| 5,903,919 A | 5/1999 | Myers |
| 5,958,041 A | 9/1999 | Petolino, Jr. et al. |
| 5,961,630 A | 10/1999 | Zaidi et al. |
| 5,964,867 A | 10/1999 | Anderson et al. |
| 5,974,538 A * | 10/1999 | Wilmot ............... G06F 9/3861 712/E9.046 |
| 5,996,061 A | 11/1999 | Lopez-Aguado et al. |
| 5,996,064 A | 11/1999 | Zaidi et al. |
| 6,016,540 A | 1/2000 | Zaidi et al. |
| 6,035,389 A | 3/2000 | Grochowski et al. |
| 6,035,393 A | 3/2000 | Glew et al. |
| 6,065,105 A | 5/2000 | Zaidi et al. |
| 6,247,113 B1 | 6/2001 | Jaggar |
| 6,282,634 B1 | 8/2001 | Hinds et al. |
| 6,304,955 B1 | 10/2001 | Arora |
| 6,425,090 B1 | 7/2002 | Arimilli et al. |
| 6,453,424 B1 | 9/2002 | Janniello |
| 6,591,359 B1 | 7/2003 | Hass et al. |
| 6,671,799 B1 | 12/2003 | Parthasarathy |
| 6,959,379 B1 | 10/2005 | Wojcieszak et al. |
| 7,069,425 B1 | 6/2006 | Takahashi |
| 7,434,032 B1 | 10/2008 | Coon et al. |
| 8,166,281 B2 | 4/2012 | Gschwind et al. |
| 9,256,428 B2 | 2/2016 | Heil et al. |
| 9,348,590 B1 | 5/2016 | Kashyap et al. |
| 9,354,884 B2 | 5/2016 | Comparan et al. |
| 10,339,095 B2 | 7/2019 | Moudgill et al. |
| 10,346,171 B2 | 7/2019 | Gabor et al. |
| 10,437,595 B1 | 10/2019 | Kanapathipillai et al. |
| 11,062,200 B2 | 7/2021 | Lie et al. |
| 11,132,199 B1 | 9/2021 | Tran |
| 11,144,319 B1 | 10/2021 | Battle et al. |
| 11,163,582 B1 | 11/2021 | Tran |
| 11,204,770 B2 | 12/2021 | Tran |
| 11,263,013 B2 | 3/2022 | Tran |
| 11,467,841 B1 | 10/2022 | Tran |
| 11,829,187 B2 | 11/2023 | Tran |
| 11,829,762 B2 | 11/2023 | Tran |
| 11,829,767 B2 | 11/2023 | Tran |
| 11,954,491 B2 | 4/2024 | Tran |
| 12,061,906 B2 | 8/2024 | Stephens et al. |
| 2001/0004755 A1 | 6/2001 | Levy et al. |
| 2003/0023646 A1 | 1/2003 | Lin et al. |
| 2003/0135712 A1 | 7/2003 | Theis |
| 2004/0073779 A1 | 4/2004 | Hokenek et al. |
| 2004/0168045 A1 | 8/2004 | Morris et al. |
| 2004/0236920 A1 | 11/2004 | Sheaffer |
| 2004/0243894 A1 | 12/2004 | Smith et al. |
| 2005/0038980 A1 | 2/2005 | Rodgers et al. |
| 2005/0251657 A1 | 11/2005 | Boucher |
| 2006/0010305 A1 | 1/2006 | Maeda et al. |
| 2006/0095732 A1 | 5/2006 | Tran et al. |
| 2006/0218124 A1 | 9/2006 | Williamson et al. |
| 2006/0259800 A1 | 11/2006 | Maejima |
| 2006/0288194 A1 | 12/2006 | Lewis et al. |
| 2007/0028078 A1 | 2/2007 | Harris et al. |
| 2007/0038984 A1 | 2/2007 | Gschwind et al. |
| 2007/0255903 A1 | 11/2007 | Tsadik et al. |
| 2007/0260856 A1 | 11/2007 | Tran et al. |
| 2008/0114966 A1 | 5/2008 | Begon et al. |
| 2008/0294882 A1 | 11/2008 | Jayapala et al. |
| 2009/0113192 A1 | 4/2009 | Hall et al. |
| 2009/0158279 A1 | 6/2009 | Iino et al. |
| 2009/0217020 A1 | 8/2009 | Yourst |
| 2010/0049958 A1 | 2/2010 | Vaskevich et al. |
| 2010/0064106 A1 | 3/2010 | Yamada et al. |
| 2011/0099354 A1 | 4/2011 | Takashima et al. |
| 2011/0153987 A1 | 6/2011 | Luke et al. |
| 2011/0320765 A1 | 12/2011 | Karkhanis et al. |
| 2012/0047352 A1 | 2/2012 | Yamana |
| 2012/0060015 A1 | 3/2012 | Eichenberger et al. |
| 2012/0124344 A1 | 5/2012 | Jarvis |
| 2012/0151156 A1 | 6/2012 | Citron et al. |
| 2013/0151816 A1 | 6/2013 | Indukuru et al. |
| 2013/0297912 A1 | 11/2013 | Tran et al. |
| 2013/0298129 A1 | 11/2013 | Rabinovitch et al. |
| 2013/0346985 A1 | 12/2013 | Nightingale |
| 2014/0059328 A1 | 2/2014 | Gonion |
| 2014/0082626 A1 | 3/2014 | Busaba et al. |
| 2015/0026435 A1 | 1/2015 | Muff et al. |
| 2015/0089141 A1 | 3/2015 | Chen et al. |
| 2015/0100754 A1 | 4/2015 | Reid et al. |
| 2015/0212972 A1 | 7/2015 | Boettcher et al. |
| 2015/0227369 A1 | 8/2015 | Gonion |
| 2015/0331760 A1 | 11/2015 | Dalessandro et al. |
| 2016/0092230 A1 | 3/2016 | Chen et al. |
| 2016/0092238 A1 | 3/2016 | Codrescu et al. |
| 2016/0275043 A1 | 9/2016 | Grochowski et al. |
| 2016/0283240 A1 | 9/2016 | Mishra et al. |
| 2016/0371091 A1 | 12/2016 | Brownscheidle et al. |
| 2017/0177345 A1 | 6/2017 | Ould-Ahmed-Vall et al. |
| 2017/0177354 A1 | 6/2017 | Ould-Ahmed-Vall |
| 2017/0185407 A1 * | 6/2017 | Shwartsman ....... G06F 12/0875 |
| 2017/0357513 A1 | 12/2017 | Ayub et al. |
| 2017/0371657 A1 | 12/2017 | Mahurin et al. |
| 2018/0181400 A1 | 6/2018 | Scherbinin et al. |
| 2018/0196678 A1 | 7/2018 | Thompto |
| 2018/0253310 A1 | 9/2018 | Stephens |
| 2018/0321938 A1 * | 11/2018 | Boswell ............... G06F 9/3001 |
| 2019/0079764 A1 | 3/2019 | Diamond et al. |
| 2019/0243646 A1 | 8/2019 | Anderson |
| 2019/0303161 A1 | 10/2019 | Nassi et al. |
| 2020/0004534 A1 | 1/2020 | Gurram et al. |
| 2020/0004543 A1 | 1/2020 | Kumar et al. |
| 2020/0065111 A1 | 2/2020 | Bouzguarrou et al. |
| 2020/0089528 A1 | 3/2020 | Gutierrez et al. |
| 2020/0125498 A1 | 4/2020 | Betts et al. |
| 2020/0310796 A1 * | 10/2020 | Pfister ............... G06F 9/30038 |
| 2020/0319885 A1 | 10/2020 | Eyole et al. |
| 2020/0387382 A1 | 12/2020 | Tseng et al. |
| 2021/0026639 A1 | 1/2021 | Tekmen et al. |
| 2021/0200550 A1 | 7/2021 | Sivtsov et al. |
| 2021/0208891 A1 | 7/2021 | Wen et al. |
| 2021/0311743 A1 | 10/2021 | Tran |
| 2021/0326141 A1 | 10/2021 | Tran |
| 2021/0389979 A1 | 12/2021 | Tran |
| 2022/0066760 A1 | 3/2022 | Chang et al. |
| 2022/0326988 A1 | 10/2022 | Gunter et al. |
| 2023/0068637 A1 | 3/2023 | Feiste et al. |
| 2023/0130826 A1 | 4/2023 | Segger |
| 2023/0214218 A1 | 7/2023 | Battle et al. |
| 2023/0244490 A1 | 8/2023 | Tran |
| 2023/0244491 A1 | 8/2023 | Tran |
| 2023/0367599 A1 | 11/2023 | Waterman et al. |
| 2023/0393852 A1 | 12/2023 | Tran |

FOREIGN PATENT DOCUMENTS

| | | |
|---|---|---|
| EP | 0959575 A1 | 11/1999 |
| WO | 0010076 A1 | 2/2000 |
| WO | 0208894 A1 | 1/2002 |
| WO | 0213005 A1 | 2/2002 |
| WO | 2024015445 A1 | 1/2024 |

OTHER PUBLICATIONS

Wang, Y., Jia, Z., Chen, R., Wang, M., Liu, D. and Shao, Z., Loop scheduling with memory access reduction subject to register constraints for DSP applications. Softw. Pract. Exper., pp. 999-1026. (Year: 2014).*

Choi, W., Park, SJ., Dubois, M. (2009). Accurate Instruction Prescheduling in Dynamically Scheduled Processors. In: Stenstrom, P. (eds) Transactions on High-Performance Embedded Architectures and Compilers I. Lecture Notes in Computer Science, vol. 5470 Springer, Berlin, Heidelberg. pp. 107-127. (Year: 2009).

(56) References Cited

OTHER PUBLICATIONS

Diavastos, Andreas & Carlson, Trevor. (2021). Efficient Instruction Scheduling using Real-time Load Delay Tracking. (Year: 2021).
J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).
Written Opinion of the International Searching Authority, PCT/S2022/052185.
Written Opinion of the International Searching Authority, PCT/US2023/018970.
Written Opinion of the International Searching Authority, PCT/US2023/018996.
Anonymous: "RISC-V—Wikipedia", Apr. 16, 2022 (Apr. 16, 2022), XP093142703, Retrieved from the Internet: URL:https://en.wikipedia.org/w/index.php?title=RISC-V&oldid=1083030760 [retrieved on Mar. 27, 2024].
PCT/US2023/018970, International Preliminary Report on Patentability, Jul. 18, 2024.
PCT/US2023/018996, International Preliminary Report on Patentability, Jul. 19, 2024.
PCT/US2023/018996, Written Opinion of the International Preliminary Examining Authority, Apr. 8, 2024.
PCT/US23/27497: Written Opinion of the International Searching Authority.
PCTUS2023081682, Written Opinion of the International Searching Authority, Mar. 22, 2024.
Written Opinion of The International Preliminary Examining Authority, PCTUS2023/018970, Mar. 25, 2024.
PCT/US2024/02037, Written Opinion of the International Searching Authority, Dec. 11, 2024.
PCT/US2024/020737 International Search Report, Dec. 11, 2024.

* cited by examiner

```
Loop:   lw      x12, 0(x9)        # load data into x12=A[i]
        addi    x9,x9,4           # Address increment
        add     x10,x10,x12       # Accumulate data to x10
        addi    x11,x11,1         # Increment iteration count
        blt     x11,x13,Loop      # Jump back to start of loop Next:
```

FIG. 2A

```
Loop:   lw      x12, 0(x9)        # load data into x12=A[i]
        addi    x9,x9,4           # Address increment
        add     x10,x10,x12       # Accumulate data to x10
        addi    x11,x11,-1        # Decrement iteration count
        bge     x11,x0,Loop       # Jump back to start of loop Next:
```

FIG. 2B

Resource Matrix

| Time | Rd buses | Wr buses | ALU | LS | MUL | DIV | BEU |
|---|---|---|---|---|---|---|---|
| 63 | | | | | | | |
| 62 | | | | | | | |
| . | | | | | | | |
| 26 | | 2 | | | | | |
| 25 | | | 2 | 1 | 1 | 0 | 1 |
| 24 | 1 | | | | | | |
| . | | | | | | | |
| 15 | 3 | 2 | 2 | 2 | 1 | 0 | 0 |
| 14 | 0 | 0 | 0 | 0 | 0 | 0 | 0 |
| . | | | | | | | |
| 0 | | | | | | | | write time → (row 26, Wr buses)
execute time → (row 25)
read time → (row 24, Rd buses)
time count → (rows 15, 14)

EXECUTING PHANTOM LOOPS IN A MICROPROCESSOR

RELATED APPLICATIONS

This application claims priority to U.S. provisional patent application Ser. No. 63/368,280, filed Jul. 13, 2022, and entitled "Executing Phantom Loops in a Microprocessor," which application is hereby incorporated by reference in its entirety.

This application is related to the following U.S. patent application which is hereby incorporated by reference in its entirety: U.S. patent application Ser. No. 17/588,315, filed Jan. 30, 2022, and entitled "Microprocessor with Time Counter for Statically Dispatching Instructions."

BACKGROUND

Technical Field

The present invention relates to the field of computer processors. More particularly, it relates to issuing and executing instructions in a processor where the processor can take the form of a general-purpose microprocessor, a digital-signal processor, a single instruction multiple data processor, a vector processor, a graphics processor, or other type of microprocessor which executes instructions.

TECHNICAL BACKGROUND

Processors have become increasingly complex, chasing small increments in performance at the expense of power consumption and semiconductor chip area. The approach in out-of-order (OOO) superscalar microprocessors has remained basically the same for the last 25-years, with much of the power dissipation arising from the dynamic scheduling of instructions for execution from reservation stations or central windows. Designing an OOO superscalar microprocessor can be a huge undertaking. Hundreds of instructions are issued to the execution pipeline where data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

Loops are frequently used in many applications. In some applications, the number of iterations can be in hundreds or thousands. In dynamic scheduling, it is difficult to track execution of a loop in the execution pipeline. Furthermore, one important factor in power consumption is reading and writing data to a register file, where the larger the register file, the more power is dissipated. In a vector processor, the vector register width can be very large, e.g., 512 bits to several thousand bits. Thus, if possible, the processor should minimize reading and writing from and to the vector register file.

Thus, there is a need for a superscalar microprocessor which efficiently executes loops, consumes less power, has a simpler design, and is scalable with consistently high performance.

SUMMARY

Embodiments disclosed herein improve processing of instruction loops by a processor. In this respect, a basic software block, or basic block, is defined as a code sequence with no branches in, except to the entry, and no branches out, except at the exit. A loop is defined as a basic block where the target address of the branch instruction at the exit point is the same as the entry point of the same basic block. In conventional loop execution, the source data are read from registers in the register file, and result data are written to destination registers of the register file on every iteration of a loop. These repeated reads and writes to the register files are a substantial source of power dissipation, especially for a vector register file with wide register data widths, e.g., 512 bits to several thousand bits.

Disclosed embodiments operate on phantom loops and in this respect, the term "phantom loop" as used herein refers to a loop in which the source registers are read once from the register file in the first iteration and the destination registers are written once to the register file after the last iteration of the loop. In one embodiment with static scheduling, the register scoreboard, the read and write port control, and the execution queue assist in execution of the phantom loop. Advantages of an embodiment of phantom loop execution include: (1) the loop iteration count instruction and the branch instruction are effectively removed from the loop iteration (2) the exiting condition of the loop is a sequential instruction which can be fetched and executed in parallel with loop execution, (3) the source and destination registers are read and written once, and (4) the re-order buffer tracks only the last iteration of the phantom loop. These advantages will become clearer by the explanation below.

Certain disclosed embodiments provide a processor with a time counter and a method for statically dispatching instructions to an execution pipeline with preset execution times based on a time count from the counter, together with a more efficient method and apparatus for executing software having loops. A microprocessor constructed in accordance with such principles employs static scheduling of instructions. A disclosed static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file.

In one embodiment a time counter increments every clock cycle and the resulting count is used to statically schedule instruction execution. Instructions have known throughput and latency times, and thus can be scheduled for execution based on the time count. For example, a multiply instruction with throughput time of 1 and latency time of 3 can be scheduled to execute when the data dependency is resolved. If the time count is 5 and the multiply has no data dependency at time 8, then the available read buses are scheduled to read data from the register file at time 8, the available multiply unit is scheduled to execute the multiply instruction at time 9, and the available write bus is scheduled to write result data from multiply unit to the register file at time 11. The multiply instruction is dispatched to the multiply execution queue with the preset execution times. The read buses, the multiply unit, and the write bus are scheduled to be busy at the preset times. The maximum time count is designed to accommodate the largest future time to schedule execution of instruction. In some embodiments, the time count is 64 and no instruction can be scheduled to execute more than 64 cycles in the future. In another embodiment a superscalar microprocessor with quad-issue can have 256 instructions in the execution pipeline. With static scheduling of instructions based on the time count, the complexity of dynamic scheduling is eliminated, the arbitration of resources is reduced, and the hundreds of comparators for data dependency are eliminated. The basic out-of-order execution of instructions operates similarly to that of a conventional out-of-order processor, but statically scheduling of instructions with a time count is more efficient. The elimination of the extra components means the processor consumes less power. Instructions are efficiently executed out-of-order with preset times to retain the performance compared to traditional dynamic approaches. The number of issued instructions is scalable from scalar to superscalar.

BRIEF DESCRIPTION OF THE DRAWINGS

Aspects of the present invention are best understood from the following description when read with the accompanying figures.

FIG. 2A and FIG. 2B illustrate examples of instruction loops the execution of which can be optimized by disclosed embodiments;

FIG. 5 is a block diagram illustrating an embodiment of a time-resource matrix;

DETAILED DESCRIPTION

Figure 1:
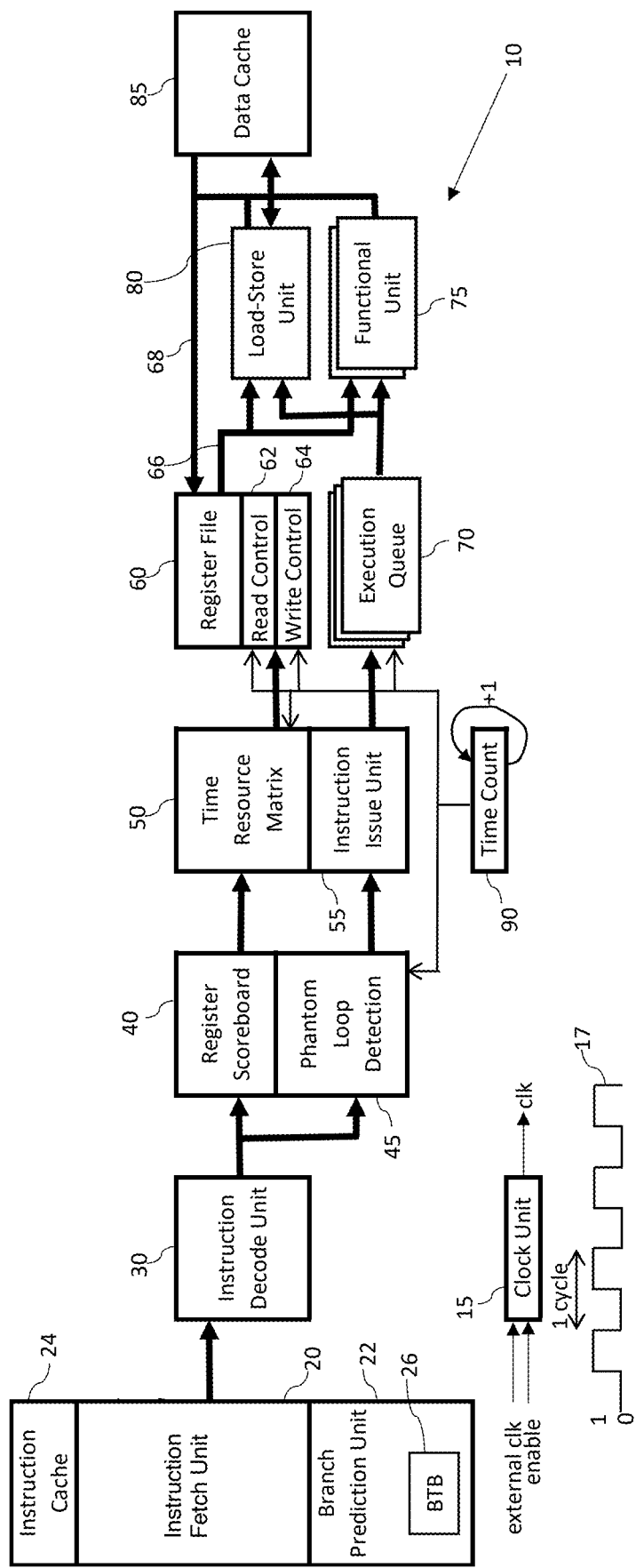
FIG. 1 is a block diagram illustrating a processor based data processing system in accordance with present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and the latency time of 2, the load instructions have the throughput time of 1 and latency time of 3 (based on a data cache hit), and the divide instruction have throughput and latency times of 32.

FIG. 1 is a block diagram of a microprocessor based data processing system. The exemplary system includes a microprocessor 10 having a clock unit 515, an instruction fetch unit a branch prediction unit 22, an instruction cache 24, an instruction decode unit 30, a register scoreboard 40, a phantom loop detection unit 45, a time-resource matrix 50, an instruction issue unit 55, a register file 60, a read control unit 62, a write control unit 64, a plurality of execution queues 70, a plurality of functional units 75, a load-store unit 80, and a data cache 85. The microprocessor 10 includes a plurality of read buses 66 that provide data from the register files 60 to the functional units 75 and load-store unit 80. The microprocessor 10 also includes a plurality of write buses 68 to write result data from the functional units 75, the load-store unit 80, and the data cache 85 to the register file 60. The microprocessor 10 is a synchronous microprocessor where the clock unit generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit enables synchronization of the many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further include an enable signal to disable the clock unit when the microprocessor is in an idle stage or not in use for instruction execution.

According to an embodiment the microprocessor 10 also includes a time counter unit which stores a time count incremented, in one embodiment, every clock cycle. The time counter unit 90 is coupled to the clock unit 15 and uses "clk" signal to increment the time count.

In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in the next cycle (time count 27). The time counter unit 90 is coupled to the register scoreboard 40, the time-resource matrix 50, the read control 62, the write control 64, and the plurality of execution queues 70. The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time. The execution queue 70 is set to dispatch an instruction to a functional unit 75 or the load-store unit 80 at a preset time. In each case, the preset time is the time setup by the decode/issue unit. The preset time is a future time based on the time count, so when the time count 90 counts up to the preset time, then the specified action will happen, where the specified action is reading data from the register file 60, writing data to the register file 60, or issuing instruction to a functional unit 75 for execution. The instruction issue unit 55 determines that an instruction is free of data dependencies and the resources are available at the "preset time" for the instruction to be executed in the execution pipeline.

In the microprocessor system 10 the instruction fetch unit 20 fetches the next instruction(s) from the instruction cache 24 to send to the instruction decode unit 30. More than one instruction can be fetched per clock cycle from the instruction fetch unit depending on the configuration of microprocessor 10. For higher performance, microprocessor 10 fetches more instructions per clock cycle for the instruction decode unit 30. For low-power and embedded applications, microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85.

The instruction fetch unit 20 is also coupled to the branch prediction unit 22 for prediction of the next instruction address when a branch is detected and predicted by the branch prediction unit 22. The branch prediction unit 22 includes a branch target buffer (BTB) 26 that stores a plurality of the entry-point addresses, branch types, offsets to exit-point addresses, and the target addresses of the basic blocks which will be discussed in detail later. The instruction fetch unit 20, the instruction cache 24, and the branch prediction unit 22 are described here for completeness of description of microprocessor 10. In other embodiments, other instruction fetch and branch prediction methods can be used to supply instructions to the instruction decode unit 30 for microprocessor 10.

The instruction decode unit 30 is coupled to the instruction fetch unit 20 to receive new instructions and also coupled to the register scoreboard 40. The instruction decode unit 30 decodes the instructions for instruction type, instruction throughput and latency times, and the register operands. The register operands, as an example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions. In the preferred embodiment the completion time is maintained in reference to the time count.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries that are read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and includes instructions for causing the computer system to execute a method. The aforementioned program modules and/or code segments may be executed on suitable computing system to perform the functions disclosed herein. Such a computing system will typically include one or more processing units, memory and non-transitory storage to execute computer-executable instructions.

FIGS. 2A and 2B are examples of software loops in RISC-V instructions which may be executed by the processor 10. The examples show accumulation of load data into a register. FIGS. 2A and 2B show two ways of calculating the iterations, one by counting up to a loop count and the other by counting down to zero, respectively. The last instruction of FIG. 2B is a branch instruction (bge, branch greater than or equal to) to compare the loop count in x11 with x0 where x0 represents zero in the RISC-V instruction set architecture. The loop count is stored in the x13 register in FIG. 2A and the loop iteration count is stored in the x11 register, which counts up to the loop count in register x13 employing the branch less than instruction. The loop count is stored in the x11 register in FIG. 2B, which is counting down to zero.

Loop detection is performed in the branch execution unit (one of the functional units 75) by keeping track of the entry point address and comparing it to the target address of the branch. If the entry address and the target address are the same, the loop will be repeated. Otherwise, the loop will be exited. The first time the instructions in a loop are executed, i.e., the first iteration, the loop existence of a loop will not be known. Upon completion of the first iteration, when the target address of the loop branch is identified to be the same as the entry address for a prior instruction, the loop is identified, and the identified loop instructions are fetched again from the instruction fetch unit 20. A loop that takes the form of a basic block can be predicted by the branch target buffer 26 of the branch prediction unit 22, as described above by comparison of entry and target addresses. A loop can be further designated as a phantom loop by the phantom loop detection unit 45 and predicted in the future by the branch prediction unit 22. On the second iteration of a loop, the loop instructions are processed by the phantom loop detection unit 45 to determine if the loop is a phantom loop. As noted above, the loop must be executed once to set up the phantom loop operation.

The phantom loop detection unit 45 detects a phantom loop based on the resources reserved for loop execution. For example, if two ALUs are reserved for phantom loop operations, then the phantom loop will not have more than two ALU instructions. Other reserved resources are read buses 66, write buses 68, and load store port in the load store unit 80. Another consideration is the accumulative operation of the add instruction as illustrated in FIGS. 2A and 2B. If the loop is identified as a phantom loop, then the source registers are read once in the first iteration and the result data written to the register file once in the last iteration of the loop. Data are forwarded locally to the reserved loop resources.

Without the phantom loop detection, a conventional execution of each iteration of the loop of FIG. 2A would require 6 source registers and 4 destination registers, thus requiring 6 reads and 4 writes to the register file 60. If the loop count is 100, then conventionally there would be 600 reads and 400 writes to the register file 60 to complete the loop execution. Thus, detecting a phantom loop saves significant power and execution time in comparison to traditional execution of the loop. Furthermore, in the preferred embodiment the re-order buffer tracks only the last iteration of the phantom loop instead of the potentially hundreds of instructions to fully execute the loop. Of course, a phantom loop can be more complicated than this example.

In the phantom loop example above, one of the source registers is the same as the destination register for the loop count increment instruction, the address increment instruction, and the accumulate instruction. The accumulate instruction adds a first register value to a second register value and writes back to the first register. The increment/decrement instruction adds a first register value to a positive/negative value and writes back to the first register. In these cases, a self-forwarding path is built into the functional unit or the address generation unit for the phantom loop operations. The result data is routed back to the first source operand data. The second source operand data is from the immediate data or second source register.

In one embodiment, the load-store unit 80 consists of an address generation unit (not shown) for calculating addresses before accessing the data cache 85. A first optimization of phantom loop execution involves merging of the address increment instruction with the load/store instruction, hi the examples of FIGS. 2A and 2B, the second instruction (addi) can be merged with the load instruction (lw) where the address increment is performed by the address generation unit of the load-store unit 80. This optimization results in concurrent execution of the lw and addi instructions. If the load instruction has non-zero immediate data, the address increment instruction cannot be merged with the load instruction. In this event, the address increment instruction is provided to an ALU functional unit and the incremented address is provided to the load-store unit 80.

A second optimization involves incorporating the loop increment instruction and branch instructions into the entries of the execution queue 70. In the examples of FIGS. 2A and 2B, there are only two real instructions in the phantom loop, the load and the accumulative add instructions. The loop count is used in the load instruction to count down the number of times the load instruction is executed by the load-store unit 80 and written to the register file 60, stopping when the loop count reaches zero. The loop count is also included in the entry of the execution queue 70 for the accumulative add instruction. The execution of the accumulative add instruction depends on the valid load data of the first instruction in the loop which is scheduled based on data cache hit load latency. If all the load data are in the data cache 85, then the accumulative add is pipelined for execution on every clock cycle.

Once the loop count counts down to zero, the result data of the accumulative add is written the register file 60. The processor 10 is effectively executing the phantom loop by reading the source data on first iteration and writing back the result data on the last iteration. Reading and writing to the register file 60 consume extra power in a conventional operation. In the phantom loop examples, the load data are forwarded directly from the data cache 85 to the accumulative add functional unit 75. The phantom-loop is executed as load multiple (several consecutive load micro-operations to load data) to fetch several data and accumulate (several consecutive add micro-operations to add to load data) into a single register. Further details of loop operations are described below.

Figure 3:
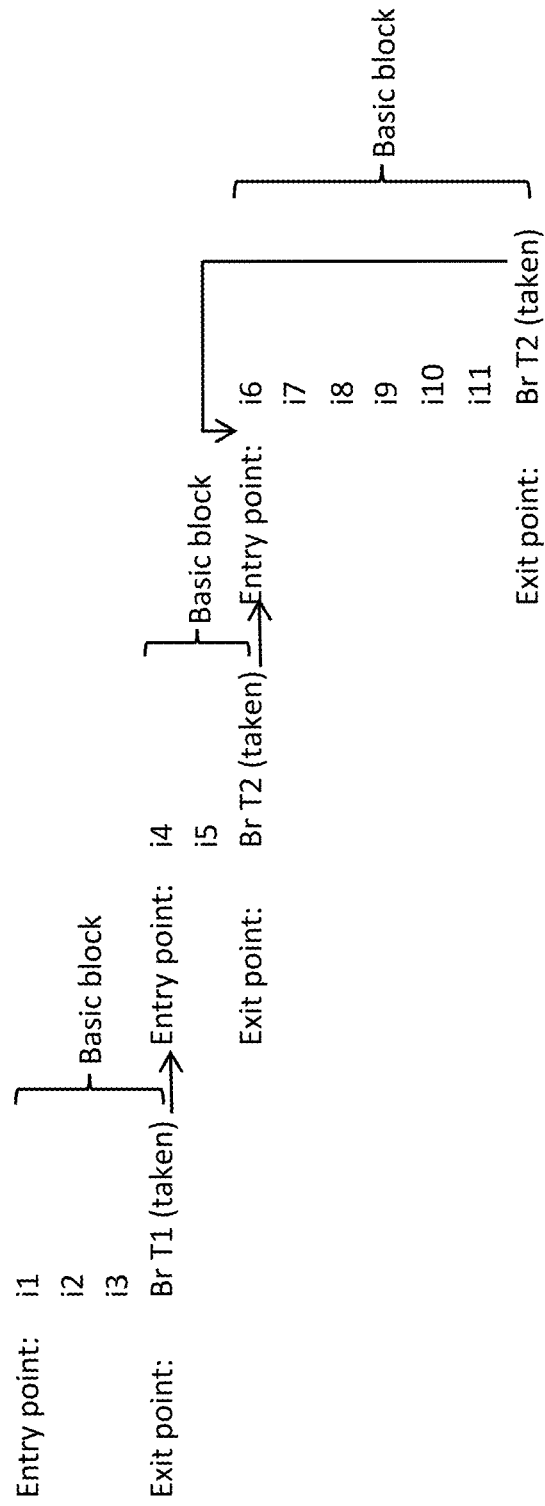
FIG. 3 illustrates a disclosed basic block detection for branch prediction.

In one embodiment, the branch prediction unit 22 is implemented using a basic-block algorithm. An example is shown in FIG. 3 of a sequence of instructions i1 to i11 where branch conditions exist after i3, i5 and i11. In this sequence of instructions, the first basic block (basic block 1) has 4 instructions, the second basic block (basic block 2) has 3 instructions, and the third basic block (basic block 3) has 7 instructions. The branch target address of basic block 3 is the entry point of the same basic block, thus indicating a loop. With basic-block branch prediction, the loop can be detected and marked as such in the branch target buffer 26. The branch prediction is based on the entry point of the basic block with an offset to the exit point or the location of the taken branch instruction. The entry point address is used to look up in a branch target buffer 26 of the branch prediction unit 22 to predict the target address of the branch instruction at the exit point of the basic block. The target address of the predicted taken branch is the entry point of the next basic block to predict the next target address. An offset from the entry point is included in the branch target buffer 26 to locate the exit point or the branch instruction of the basic block. The branch prediction unit 22 predicts all loops and adds information in the branch target buffer 26 for the loop types.

The loop execution exits to the sequential instruction after the loop as indicated as "Next" in the loop examples of FIGS. 2A and 2B. The phantom-loop is detected and written to the branch target buffer 26. The phantom loop then becomes a series of micro-operations for instructions in the loop. In one embodiment, the phantom loop is predicted as a non-taken prediction by the branch prediction unit 22. The sequential instructions after the phantom loop can be fetched and executed concurrently with the execution of the phantom loop.

Referring back to FIG. 1, in its first iteration the loop is detected by the branch prediction unit 22 and fetched by the instruction unit 20 to the instruction decode unit 30. The loop instructions are provided to the register scoreboard 40 and the phantom-loop detection unit 45. In one embodiment, the first iteration of the loop is normally executed while the loop is being detected as a phantom loop in the phantom-loop detection unit 45. If the loop is identified as a phantom loop, then the second iteration begins the phantom loop operation. The phantom loop detection unit 45 detects (1) the branch instruction, for which the corresponding register is used for the loop count to store the loop count value, (2) the loop count increment/decrement instruction, (3) the address increment instruction and immediate data for the load/store instructions. It also detects (4) all other instructions issued with the loop count to the execution unit, and (5) determines that the number of instructions is equal to or less than the number of available functional units. In another embodiment, the phantom loop is marked as such in the branch target buffer of the branch prediction unit 22. The phantom loop entry in the branch target buffer has sufficient information so that the phantom loop starts execution immediately without going through the phantom loop detection unit 45. Assuming, the number of instructions in the phantom loop is less than 16, 4 bits are needed for the offset from the entry point of the basic block to locate the instructions in the phantom loop corresponding to the detection of phantom loop by the phantom loop detection unit 35. The phantom loop entry in the branch target buffer includes the offset for self-increment and accumulative instructions and resources required for the phantom loop.

Figure 4:
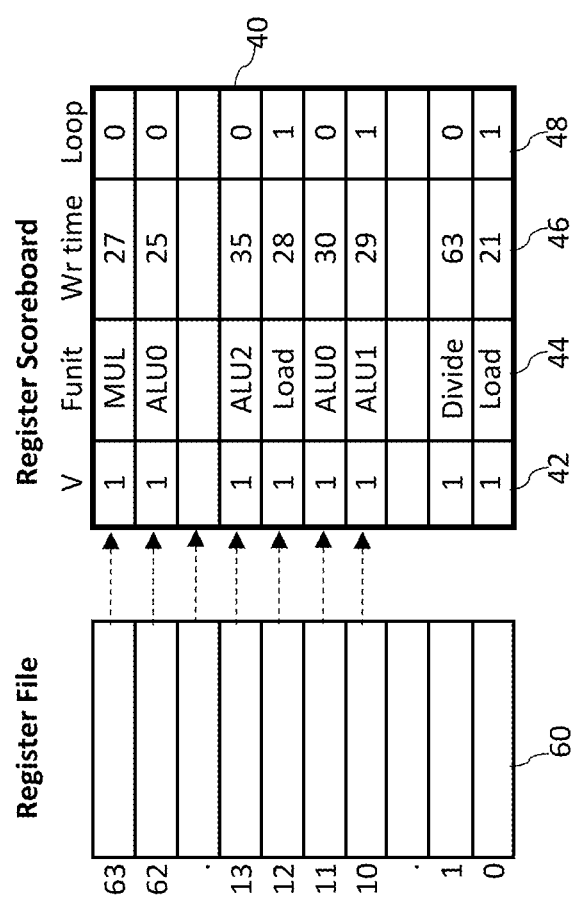
FIG. 4 is a block diagram illustrating an embodiment of a register file and a register scoreboard.

FIG. 4 illustrates the register file 60 and the register scoreboard 40. In one embodiment, the register file 60 has 64 registers, numbered as registers 0 to 63 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples illustrated in FIG. 4, register 0 is written back at time count 21 from the load-store unit 80. Register 1 is written back at time count 63 from the divide unit (one of the functional units 75). Register 10 is written back at time count 29 from the ALU1, (another of the functional units 75), etc. as illustrated in FIG. 4. The write time 46 is the time in reference to the time count 90. The result data is written to the register file 60, The data are not available from the register file 60 until the next clock cycle, but the result data can be forwarded from the functional unit 44 in the register scoreboard 40. For example, if the value of the time count 90 is 19, then the load-store unit 80 produces the result data in 2 clock cycles for writing back to the register file 60.

The registers may be assigned to a phantom loop operation depending on the loop bit field 48 of the register scoreboard 40. As examples illustrated in FIG. 4, the data in registers 10 and 12 are part of the phantom loop when loop bits 48 are set. Setting of a loop bit 48 means that result data do not write back to the register file until the last iteration of the phantom loop, then the loop bit 48 is reset by the execution unit 70. Since the result data are forwarded directly from the functional unit 44 to the source data of the next functional unit, writes and reads from the register file 60 are not necessary. In one embodiment, the result data are written back to the register file every clock cycle, ignoring the setting of the loop bits 48. The advantage is related to an exception where the register file 60 has the latest result data before the exception. In another embodiment, the functional units 75 and the load-store unit 80 keeps last valid result data to write back to the register file 60 on exception. If there is no exception, then it is possible to wait to write until the last iteration. An exception means that the loop is disrupted by an unexpected event and must stop before the last iteration. Therefore, updating the register file every clock cycle ensures that the register file is updated before the exception. Otherwise, on exception, the latest valid result must be forced to be written to the register file before taking the exception.

In another embodiment, the write times 46 of registers 10 and 12 are incremented every clock cycle as long as the loop bits 48 are set. For example, register 12, when the time count is 28, the valid bit 42 remains set and the write time 46 is incremented as long as the loop bit 48 is set. On the last iteration of the phantom loop, the load-store execution queue 70 resets the loop bit 48 to allowing writing back to the register file 60. Similarly, the ALU execution queue 70 resets the loop bit 48 for register 10. The write time 46 functionality is the same as other non-loop entries. If the load data is not in the data cache 80, then the load-store unit 80 modifies the write time with the L2 cache latency time which will cause the subsequent dependent instruction to be replayed. The read time of the loop entry in the ALU execution queue 70 is modified with the new write time 46 of register 12 of the register scoreboard 40. For register 10, the result data from the ALU functional unit do not forward to any other functional unit and do not write back to the register file until the last iteration of the phantom loop. It is not necessary to modify the write time 46 of register 10, but the write time 46 may be changed every clock cycle and updated with delayed write time for consistency with other registers in the register scoreboard 40. Said differently, in this example, loop iteration updates the registers 10 and 12 every clock cycle. If there is an instruction after the loop that wants to use register 10 or 12, then it must wait until the loop is completed before forwarding data to the instruction after the loop.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the required data is in the register file 60 and can be accessed at any time providing availability of the read buses 66, else the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. In one embodiment, the load and store instructions are executed in order to simplify the data dependencies of the load and store instructions. The load instruction may read from the same address as the previous store instruction in which case the data are forwarded from the store instruction instead of reading from the data cache 85. The load store unit must keep track of the order of load and store instructions for correct processing of data dependency. Keeping the order of load and store instructions in the execution queue 70 allows the addresses to be calculated in order for any data dependency. The load-store execution queue (one of the plurality of execution queues 70) keeps the latest busy time of the load or store instructions. The read time of a load or store instruction is determined from the write times 46 of the source registers from the register scoreboard 40 or the latest busy time of the load-store execution queue 70. In another embodiment, the resources (read buses, write buses, and functional units) also have the latest busy times which are needed for the phantom loop operations. The resources are reserved and used every clock cycle for phantom loop operations until the completion of the loop and cannot be in conflict with previous instructions. The phantom loop can start after the latest busy time of all necessary resources. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. If the current time count is 5 and the source registers of an add instruction receive write time counts of 22 and 24 from the register scoreboard 40, then the read time count is set at 24. In this case, the execution and the write time count are both 25 for the add instruction. As shown in FIG. 1, the register scoreboard 40 is coupled to the time-resource matrix 50 where the read, execute, and write times of an instruction access the time-resource matrix for availabilities of the resources.

FIG. 5 illustrates the time-resource matrix 50. The time-resource matrix 50 preferably includes the same number of time entries as the time counter 90. For example, if the time counter 90 is 64 cycles, then the time-resource matrix 50 has 64 entries. The time counter is incremented every clock cycle and rotates back from the 63th entry to the 0th entry. The columns in the time-resource matrix 50 represent the available resources for the read buses 51, the write buses 52, the ALUs 53, the load-store ports 56, the multiply unit 57, the divide unit 58, and the branch execution unit (BEU) 59. If other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1.

FIG. 5 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, 1 read bus is busy. At execution time 25, 2 ALUs, 1 load-store port, 1 multiply unit, and 1 BEU are taken for execution of previous instructions, and at write time 25, 2 write buses are busy. In one embodiment, the numbers of read buses, write buses, ALUs, load/store ports, multiply unit, divide unit, and BEU are 4, 4, 3, 2, 1, 1, and 1, respectively. If an add instruction with 2 source registers and 1 destination register is issued with read time of 24, execution time of 25, and write time of 25, then the number of read buses 51 at time 24, write buses 52 at time 25, and ALUs 53 at time 25 are incremented to 3, 3, and 3, respectively. The read bus 51 indicates that 1 read bus is busy, so the next 2 read buses 1 and 2 (in-order) are assigned to the source registers of the add instruction. The ALU unit 53 indicates that 2 ALUs are busy, so the next in-order ALU 2 is assigned as functional unit for execution of the add instruction. The write bus 52 indicates that 2 write buses are busy, so the next in-order write bus 2 is assigned to write back data from ALU 2 to the register file 60. The resources are in-order assigned to the instructions. The source registers of the add instruction will receive data from read buses 1 and 2, ALU 2 is used for execution of the add instruction and write bus 2 is used to write back data from ALU 2. The counts in the row are reset by the time count. As illustrated in FIG. 5, when the time count is incremented from 14 to 15, all resource counts of row 14 are reset. All resource counts of row 15 are reset when the count is incremented to 16 in next cycle. If an issued instruction is a multiply instruction with execution time of 25, because there is only one multiply unit 57, the issued instruction cannot be issued for execution time of 25. If the number of busy resources is equal to the maximum allocatable resources, then the instruction cannot be issued in the same cycle. In another embodiment, two sets of read times, execution times, and write times are used per instruction with an expectation that one set of times is free of conflict, increasing the chance for issuing an instruction. One set is for the loop and the other set is for an instruction after the loop. In another embodiment, the counts 51, 52, 53, 56, 57, 58, and 59 indicate the number of available resources. The resource counts are decremented if the resource is assigned to an issue instruction.

In one embodiment, some resources are reserved for the phantom loop operations. For example, the last 2 read buses (read buses number 2 and 3) of the 4 read buses are used for the phantom loop operations. A phantom loop operation cannot start until the latest busy time of the read buses 2 and 3. During the phantom loop operation, the time-resource matrix 50 adjusts the maximum available read buses to 2 for issuing subsequent instructions after the phantom loop. The instructions after the phantom loop can be concurrently executed with the phantom loop operations. The phantom loop detection unit 45 determines the resources needed for the phantom loop operations which may include the read buses, the write buses, and the functional units. The earliest time to start the phantom loop operation is based on the latest busy times of all required loop resources. The resource latest busy times are in addition to the write times 46 of the source registers from the register scoreboard 40, thus determining the first read time of the phantom loop operation.

The write bus 52 is not needed by the phantom-loop operations, so no write bus is reserved for the phantom-loop operations until the last iteration of the loop. The execution queue checks the write bus 52 of the time-resource matrix 50 on the last iteration of the loop to write back to the register file 60. In another embodiment, a write bus 52 is reserved as part of the required resources to be used by the last iteration of the phantom loop. All the required resources for phantom loop operation are then no longer part of the time-resource matrix 50 and the time-resource matrix 50 adjusts the maximum available resources.

All available resources for the required times are read from the time-resource matrix and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts are incremented by one, and the time-resource matrix is checked as soon as the same cycle or next cycle. The particular number of read buses 66, write buses 68, and functional units 75 in FIG. 1 is preferably chosen to minimize stalling of instructions in the instruction issue unit 55.

Figures 6A, 6B:
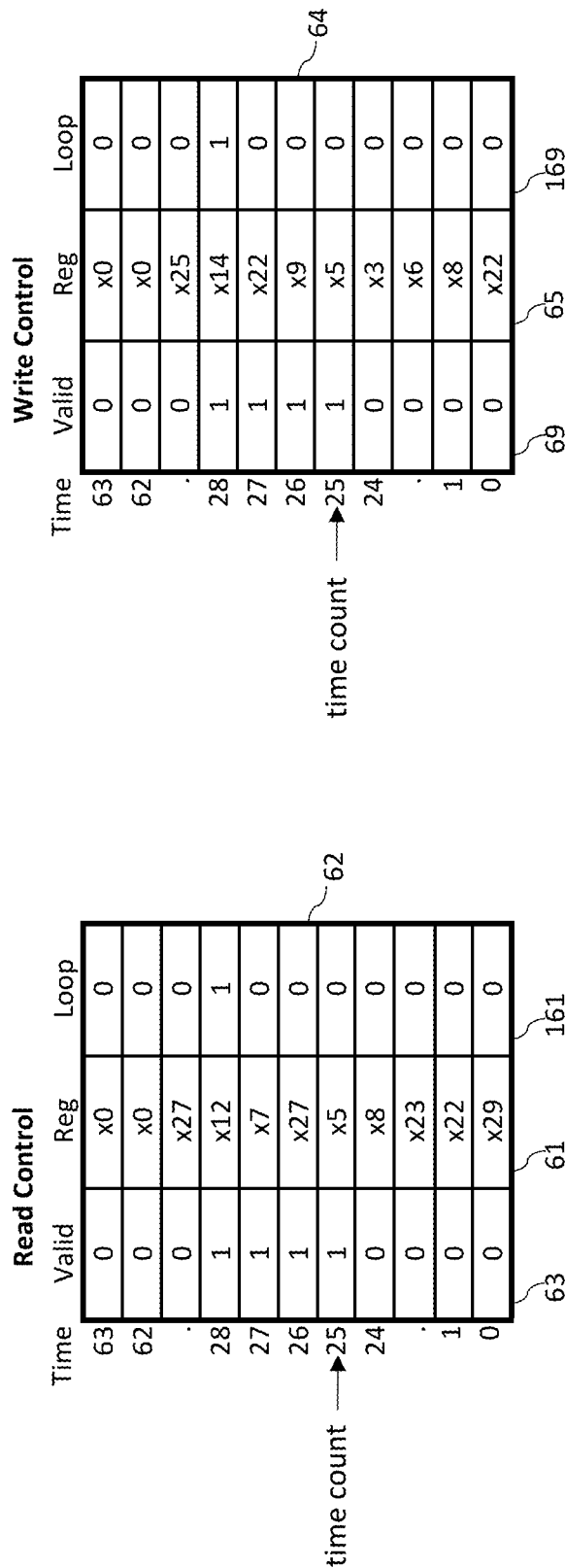
FIG. 6A and FIG. 6B are block diagrams illustrating a read bus control and a write bus control operation.

FIG. 6A illustrates a single read bus of the read control unit 62 and FIG. 6B illustrates a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the valid bit 63, the source registers 61, and the loop bit 161. The columns in the write control unit 64 represents the valid bit 69, the destination registers 65, and the loop bit 169. When the time count is incremented from 24 to 25, the valid bits 63 and 69 of row 24 are reset to indicate that those resources have been freed up. The valid bits 63 and 69 of row 25 are reset when the count is incremented to 26 in the next cycle. FIGS. 6A and 6B show a single read bus 66 and a single write bus 68, respectively. If 4 read buses and 3 write buses are implemented, then the functionality of FIGS. 6A and 6B are duplicated 4 times and 3 times, respectively.

In one embodiment, the phantom loop operations use the read control unit 62 to forward data from a first functional unit 75 or load-store port 80 to a second functional unit 75 or load-store port 80. The loop bit 161 of the read control unit 62 is used to indicate the start of the phantom-loop operation. In the example illustrated in FIG. 6A, the phantom-loop starts at time count 28 where the loop bit 161 is set. When the time count is 28, the loop bit 161 causes all the valid bits 63 to be set and the x12 in the register field 61 to be copied to all entries.

In another embodiment, because the time-resource matrix 50 blocks any instruction from using this read port 62, a loop active bit and register x12 can be used for every cycle of phantom loop operation instead of accessing the read port 62 every clock cycle. The read port 62 is now dedicated to phantom-loop operation where the register x12 accesses the register scoreboard to assure that the data from the first functional unit or load-store port are still valid for execution. In FIG. 6B, the loop bit 169 is set at time 28 to reserve the write bus 64 for writing back data on the last iteration of the phantom loop. At this time all loop destination registers are written back to the register file 60 including the last load-store address, the loop count, the load data, and the accumulative result data.

In the example illustrated in FIG. 6A, at the time count of 25 in the read control unit 62 the data in register x5 from the register field 61 of the read control 62 is used to read the entry from the register scoreboard 40 for the "Wr time" 46 and the "Funit" 44. If the write time 46 is the same as the time count 90, then the result data is written back to the register file 60 in the same clock cycle. The result data from the "Funit" 44 can be forwarded to the read bus 66 by the "Funit" 44 instead of being read from the register file 60. The write time 46 may have changed due to a cache miss of the load instruction, in which case the instruction cannot be executed yet because the source operand data is not valid. The RAW dependent instruction is rescheduled to be executed at a later time. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 operates to provide centralized control for the read buses 66, thus reducing complexity from the hundreds of instructions in dynamic scheduling architectures. The above data forwarding mechanism from one functional unit to another functional unit applies to phantom loop operations including delaying of load data forwarding.

Similarly in FIG. 6B, the register x5 from the register field 65 of the write control unit 64 at time count of 25 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. In one embodiment, the valid bit field 69 in register 65 of write control unit 64 is responsible to clear the valid bit 42 from the register scoreboard 40 of FIG. 4 if the corresponding "Wr time" field 46 is the same as the time count 90.

It is possible that the write time 46 of the register scoreboard 40 has been modified due to a delay in write time. An alternative is to compare the current time count to all "Wr time" fields 46 of the register scoreboard 40 and to clear the valid bit 42 for matching times. This alternative results in higher power consumption, if for example, there are 100 registers in the register scoreboard 40. In one embodiment, the write to register file is blocked if the loop bit 169 is set. The loop bit 169 is reset on the last iteration of the phantom loop operation to allow writing back to the register file 60 as normal. The write control unit 64 operates as a centralized control for the write buses 68 which removes complexity compared to distributing such control among the plurality of functional units in dynamic scheduling.

Figure 7:
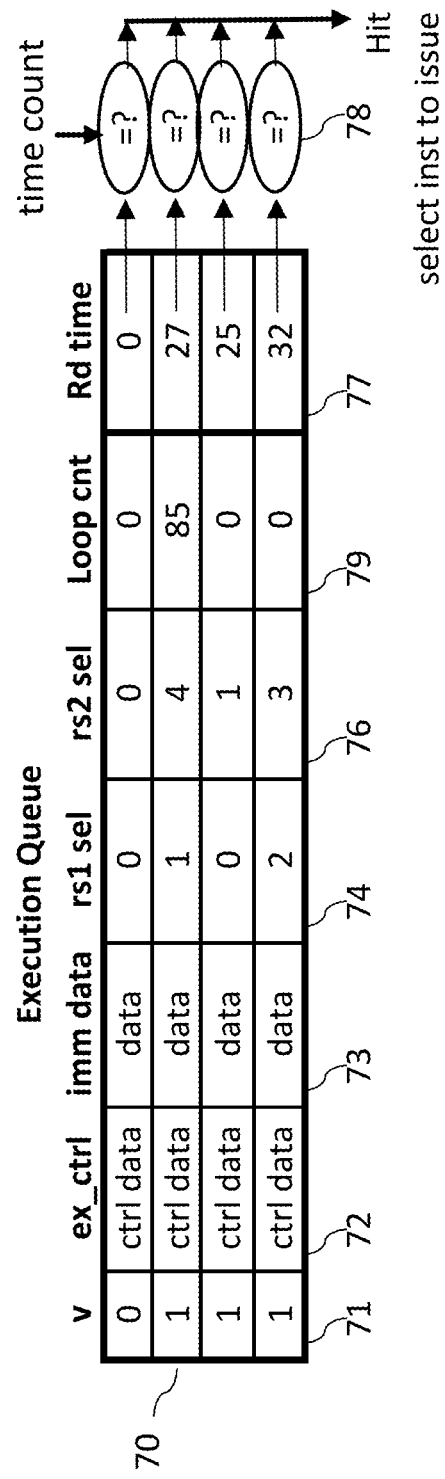
FIG. 7 is a block diagram illustrating an execution queue.

FIG. 7 illustrates an example of a 4-entry execution queue 70. The number of entries for the execution queue 70 is only an illustration. The invention is not limited to any particular number of execution queue 70 entries, and the execution queue 70 could be a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, the loop count 79, and the read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74 and 76 may not be used for some instructions. For a phantom loop, the loop count field 79 is written when the phantom-loop instruction is issued to the execution queue 70. In addition, the immediate data field 73 is updated with the loop incremented value from the address incremented instruction of the phantom loop. Another read control port 62 is used for transferring data from the ALU functional unit 75 to the load-store unit 80. The load-store unit 80 may be stalled due to cache miss, in which case the stall will cause the address incremented instruction to stall in the execution queue 70. The execution queue 70 may include additional fields for writing back the last address of the address increment instruction and the last loop count value to the register file 60.

Note that the destination register can be, but does not need to be, kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 7, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85, The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs.

Furthermore, the invention is not limited to integer functional units. In other embodiments the functional units include floating point units, digital-signal processing units, vector processing units, or custom designed units. The phantom loop detection unit 45 detects the phantom loop based on the number of available resources and restrictions. A number of read buses 66, a number of write buses 68, a number of functional units 75, and/or load-store port of load-store unit 80 are reserved for phantom loop operations. The execution queue 70 keeps track of the loop count and dispatches loop instructions to the functional units 75 and/or the load-store unit 80.

The examples in FIGS. 2A and 2B are for illustration and do not restrict the type of loop that could constitute a phantom loop. For example, the phantom loop may be a search loop without the loop count where the exiting condition is data matching with a register in the register file 60. For a search loop, the loop count 79 in the execution queue 70 is set to maximum value and does not count down on each iteration. The functional units 75 and/or the load-store port 80 keep the last valid result data to be written back to the register file 60 in case of exception or exiting condition of the loop. A microprocessor has been used herein for illustration of the phantom loop operation, but the phantom loop operation can be used in a vector processor, a graphic processing unit, or other accelerators where the registers have much larger data width. For example, not writing intermediate result data to 1024-bit vector registers for 100-iteration loop is more advantageous in saving power dissipation of vector processor.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
   a register file including a plurality of registers;
   a phantom loop detection circuit that detects a phantom loop in a set of instructions, wherein the phantom loop is a loop in which source data is read from the register file only on a first iteration of the loop and result data is written to the register file only on a last iteration of the loop;
   an instruction issue unit coupled to the phantom loop detection circuit for receiving instructions from the phantom loop detection circuit, and issuing those instructions;
   an execution queue coupled to the instruction issue unit to receive a first instruction of the loop when the phantom loop is detected from the instruction issue unit, and dispatch the first instruction to a functional unit upon each iteration of the phantom loop until completion of the phantom loop; and wherein the functional unit writes back result data to the register file only upon completion of the phantom loop.

2. The processor of claim 1 further comprising:
a branch prediction unit that predicts the phantom loop and provides a target address for a branch instruction at an exit point of the phantom loop.

3. The processor of claim 1 further comprising:
a clock circuit characterized by a clock cycle;
a time counter that stores a time count representing a current time of the processor and periodically increments the time count as a function of the clock cycle, the time counter comprising,
an N-bit counter wherein an Nth-bit count value represents a largest future time for the instruction issue unit to issue an instruction and wherein the N-bit counter returns to a zero count after reaching the Nth-bit value; and
wherein the processor executes every instruction according to a preset execution time which is correlated to the time count.

4. The processor of claim 3 further comprising:
a register scoreboard storing a write time of data stored in a register in the register file, the write time being a future time based on the time count; and
wherein the register scoreboard includes storage for a loop bit, the loop bit indicating that the data stored in the register is part of the phantom loop.

5. The processor of claim 4 further comprising a plurality of phantom loop resources reserved for executing instructions of the phantom loop, and wherein the reserved phantom loop resources include at least one of a plurality of read buses, a plurality of write buses, and a plurality of functional units.

6. The processor of claim 5 further comprising an instruction
decode unit that determines an execution time for a selected instruction from one of a latest busy time of one of the phantom loop resources and write times of source operands of the selected instruction.

7. The processor of claim 6 further comprising:
a time-resource matrix unit coupled to the register scoreboard and the time counter for storing information relating to availability of processor resources for each time count of the time counter, and wherein the processor resources include at least one of: the plurality of read buses, the plurality of write buses, and the plurality of functional units;
wherein the time-resource matrix unit adjusts the information based on resources used by an active phantom loop operation; and
wherein the instruction issue unit is coupled to the time resource matrix unit to receive data therefrom to issue a second instruction if all resources required by the second instruction are specified by the time-resource matrix unit as being available, and to stall the second instruction if any of the resources required by the second instruction is specified by the time-resource matrix unit as not being available.

8. The processor of claim 7 wherein the instruction issue unit receives the second instruction after execution of the phantom loop and issues the second instruction.

9. The processor of claim 7 further comprising:
a read control unit that controls a source of data that is provided on a first read bus of the plurality of read buses, the source of data comprising a source register of the register file or a forwarding functional unit, the read control unit containing an entry for each time count of the time counter wherein each entry of the read control unit specifies a respective register and includes a valid bit that indicates whether the respective register contains valid data, wherein the read control unit further stores a loop bit for each entry to indicate a beginning of the active phantom loop operation.

10. The processor of claim 9 further comprising:
a write control unit that contains an entry for each time count of the time counter wherein each entry of the write control unit specifies a respective destination register, a valid bit that specifies whether data in the respective destination register is valid and a loop bit that specifies a start of the active phantom loop operation;
wherein the write control unit operates to reserve a first write bus for writing back data from a first selected functional unit to a first destination register in the register file; and
only on a last iteration of the phantom loop.

11. The processor of claim 10 wherein the execution queue stores a first plurality of instructions, each instruction of the first plurality of instructions having associated therewith a read time, which is a future time based on the time count, and an associated loop count corresponding to a selected phantom loop; and
wherein each instruction of the first plurality of instructions is dispatched to a second selected functional unit every clock cycle and the associated loop count is decremented until the associated loop count is reset.

12. The processor of claim 11 wherein the execution queue stores a plurality of read times and wherein each of the read times in the execution queue is stored in the read control unit.

13. The processor of claim 12 wherein the execution queue dispatches instructions to at least one functional unit.

14. A processor comprising:
a clock circuit;
a time counter storing a time count representing a current time of the processor, wherein
the time count is incremented with each cycle of the clock circuit;
a register file including a plurality of registers;
a loop detection circuit that detects a phantom loop in a set of instructions, wherein the phantom loop is a loop in which source data is read from the register file only in a first iteration of the phantom loop and result data is written to the register file only on a last iteration of the phantom loop;
an instruction issue unit coupled to the loop detection circuit for receiving instructions from the loop detection circuit, and issuing instructions within a detected phantom loop;
an execution queue coupled to the instruction issue unit to receive a first phantom loop instruction from the instruction issue unit, and dispatch the first phantom loop instruction to a functional unit for every iteration of the detected phantom loop until completion of the detected phantom loop, and then writing back result data of a last iteration of the detected phantom loop to the register file;
a register scoreboard storing a first write time and a loop bit to a selected register in the register file, wherein the first write time is a future time based on the time count and wherein the loop bit indicates the selected register is used in a phantom loop operation;

an instruction decode unit that determines an execution time for a selected instruction;

a time-resource matrix coupled to the register scoreboard and the time counter for storing information relating to available resources for each time count of the time counter and wherein the information relating to the available resources is adjusted to account for resources used by the phantom loop operation;

wherein the available resources include at least one of: a plurality of read buses, a plurality of write buses, and a plurality of functional units.

15. A computer program product for implementing a microprocessor, the computer program product stored on a non-transitory computer readable storage medium and including instructions for causing a computer system to execute a method, that is executable by the microprocessor, for detecting a phantom loop based on available resources dedicated to execution of a phantom loop operation by the microprocessor, the method executable by the computer system comprising:

detecting among a group of instructions that constitute a loop, a phantom loop in which source data is read from a register file only on a first iteration of the phantom loop and result data is written to the register file only on a last iteration of the phantom loop;

reserving a plurality of resources for execution of the phantom loop, the plurality of resources including a plurality of read buses, a plurality of write buses, and a plurality of functional units;

providing instructions in the phantom loop to an execution queue in the microprocessor processor for execution by a selected functional unit of the plurality of functional units; and forwarding result data from the selected functional unit to another functional unit without writing to any register until a last iteration of the phantom loop.

16. The computer program product of claim 15 wherein the instructions in the phantom loop are executed at future times based on a time count from a periodically incremented time counter and the time counter provides a maximum time count corresponding to a latest future time to issue an instruction.

17. The computer program product of claim 16, wherein the method executable by the microprocessor further comprises: storing a write time and a first loop bit in a first register of the register file wherein the write time is a future time based on the time count and wherein the first loop bit indicates the first register is used in the phantom loop.

18. The computer program product of claim 17, wherein data corresponding to the plurality of resources is stored in a time-resource matrix; and wherein the data corresponding to the plurality of resources is adjusted depending on resources used by an active phantom loop.

19. The computer program product of claim 18, wherein the method executable by the microprocessor further comprises:

storing data and a second loop bit in a second register of the register file associated with a read control unit, wherein the data in the second register are read from the register file and transported on a first read bus of the plurality of read buses, wherein the second loop bit reserves the first read bus for a selected phantom loop operation until completion of the selected phantom loop operation.

20. The computer program product of claim 19, wherein the method executable by the microprocessor further comprises: storing data and a third loop bit in a third register of the register file associated with a write control unit, wherein result data are transported from a first write bus of the plurality of write buses and written to a fourth register of the register file, and wherein the third loop bit reserves the first write bus for writing back result data of the selected phantom loop operation only on a last iteration of the selected phantom loop operation.

21. The computer program product of claim 16, wherein the method executable by the microprocessor further comprises:

storing a first set of instructions in the execution queue wherein each instruction of the first set of instructions in the execution queue includes a read time based on the time count and a respective loop count;

dispatching instructions repeatedly to a functional unit every clock cycle; and decrementing the respective loop count until the respective loop count is reset.

22. The computer program product of claim 21, wherein the execution queue is configured to dispatch instructions to at least one functional unit.

23. The computer program product of claim 21, wherein the method executable by the microprocessor further comprises:

storing data and a second loop bit in a second register of the register file associated with a read control unit, wherein the data in the second register are read from the register file and transported on a first read bus of the plurality of read buses, wherein the second loop bit reserves the first read bus for a selected phantom loop operation until completion of the selected phantom loop operation; and synchronizing read time of the execution queue with the read control unit.

24. The computer program product of claim 15, wherein the method executable by the microprocessor further comprises:

predicting the phantom loop with a branch prediction unit; and storing data related to the phantom loop prediction in the branch prediction unit.

* * * * *